(12) United States Patent
Pikovsky et al.

(10) Patent No.: US 10,012,110 B2
(45) Date of Patent: Jul. 3, 2018

(54) TURBOMACHINE ASSEMBLY COMPRISING TWO BODIES AND MEANS FOR GUIDING A FLUID FLOWING FROM ONE BODY TO THE OTHER

(71) Applicant: SNECMA, Paris (FR)

(72) Inventors: Catherine Pikovsky, Brunoy (FR); Dominik Igel, Hericy (FR); Boris Lemattre, Chateau l'Abbaye (FR)

(73) Assignee: SNECMA, Paris (FR)

( * ) Notice: Subject to any disclaimer, the term of this patent is extended or adjusted under 35 U.S.C. 154(b) by 551 days.

(21) Appl. No.: 14/583,910

(22) Filed: Dec. 29, 2014

(65) Prior Publication Data
US 2015/0198065 A1    Jul. 16, 2015

(30) Foreign Application Priority Data

Jan. 10, 2014   (FR) ..................................... 14 50199

(51) Int. Cl.
*F01D 11/02*   (2006.01)
*F01D 25/18*   (2006.01)
(Continued)

(52) U.S. Cl.
CPC ............ *F01D 25/183* (2013.01); *F01D 11/02* (2013.01); *F02C 7/28* (2013.01); *F02K 3/062* (2013.01);
(Continued)

(58) Field of Classification Search
CPC ...... F01D 25/183; F01D 11/02; F01D 25/186; Y02T 50/66; F02K 3/062; F02K 3/072;
(Continued)

(56) References Cited

U.S. PATENT DOCUMENTS 752,170 A * 2/1904 Krogh ................... F16J 15/406
277/430
8,092,093 B2 * 1/2012 Fang ...................... F01D 11/02
277/423
(Continued)

FOREIGN PATENT DOCUMENTS

DE    25 43 258 A1    3/1977
EP    2 157 289 A2    2/2010
FR    2 991 404 A1    12/2013

OTHER PUBLICATIONS

French Preliminary Search Report dated Sep. 23, 2014, in Patent Application No. FR 1450199, filed Jan. 10, 2014 (with English Translation of Category of Cited Documents).

*Primary Examiner* — Jason Shanske
*Assistant Examiner* — Jesse Prager
(74) *Attorney, Agent, or Firm* — Oblon, McClelland, Maier & Neustadt, L.L.P.

(57) ABSTRACT

A turbomachine assembly including first and second bodies, in which one of the bodies is rotating relative to the other body around the axis of rotation of the turbomachine, is provided. A tight zone is formed between the bodies and includes a sealing gasket. A flowing fluid, in particular lubricant oil, is able to circulate inside the first and second bodies and to be driven toward the one rotating body from the other body. The one rotating body includes a device for guiding the rotation, in the direction of rotation of the one rotating body, of the flow of fluid inside the one rotating body so as to drive the flowing fluid away from the tight zone.

8 Claims, 4 Drawing Sheets

(51) Int. Cl.
   *F02K 3/062* (2006.01)
   *F02K 3/072* (2006.01)
   *F02C 7/28* (2006.01)
   *B64D 27/00* (2006.01)

(52) U.S. Cl.
   CPC ........ *F02K 3/072* (2013.01); *B64D 2027/005* (2013.01); *F05D 2220/325* (2013.01); *Y02T 50/66* (2013.01)

(58) Field of Classification Search
   CPC ........ F02C 7/20; F02C 7/28; B64D 2027/005; F05D 2220/325; F16J 15/406
   USPC ........................................ 277/418, 423, 430
   See application file for complete search history.

(56) References Cited

U.S. PATENT DOCUMENTS

| | | | |
|---|---|---|---|
| 2011/0024567 A1* | 2/2011 | Blackwelder | B64D 15/12 244/134 D |
| 2013/0214492 A1 | 8/2013 | Nielsen et al. | |
| 2013/0302136 A1* | 11/2013 | Grover | F01D 11/001 415/1 |
| 2014/0062029 A1* | 3/2014 | Amador | F01D 11/02 277/415 |

* cited by examiner

TURBOMACHINE ASSEMBLY COMPRISING TWO BODIES AND MEANS FOR GUIDING A FLUID FLOWING FROM ONE BODY TO THE OTHER

TECHNICAL FIELD

The present invention relates to the field of turbomachines, and more particularly the general field of systems for circulating a fluid flowing in a turbomachine, and in particular lubricant oil. It more precisely relates to a turbomachine assembly provided with means for guiding the flowing fluid, a turbomachine comprising such an assembly, and an associated method for guiding a stream of flowing fluid.

The invention applies to any type of land or aeronautic turbomachines, and in particular aircraft turbomachines such as turbojet engines and turboprops. The invention may preferably apply to the field of turbomachines for aircraft whose receiver comprises a pair of contrarotating open rotors, this type of turbomachine also being referred to as "open rotor" or "prop fan". Such a turbomachine may for example comprise a fan fixed directly on the power turbine and outside the nacelle, or driven by means of a power reducing turbine.

BACKGROUND OF THE INVENTION

In the general field of turbomachines, turbomachines with open rotors have a global architecture that differs from the conventional turbomachine architectures. In fact, as previously recalled, such turbomachines are characterized by the presence of two contrarotating open rotors at the fan.

Figure 1:
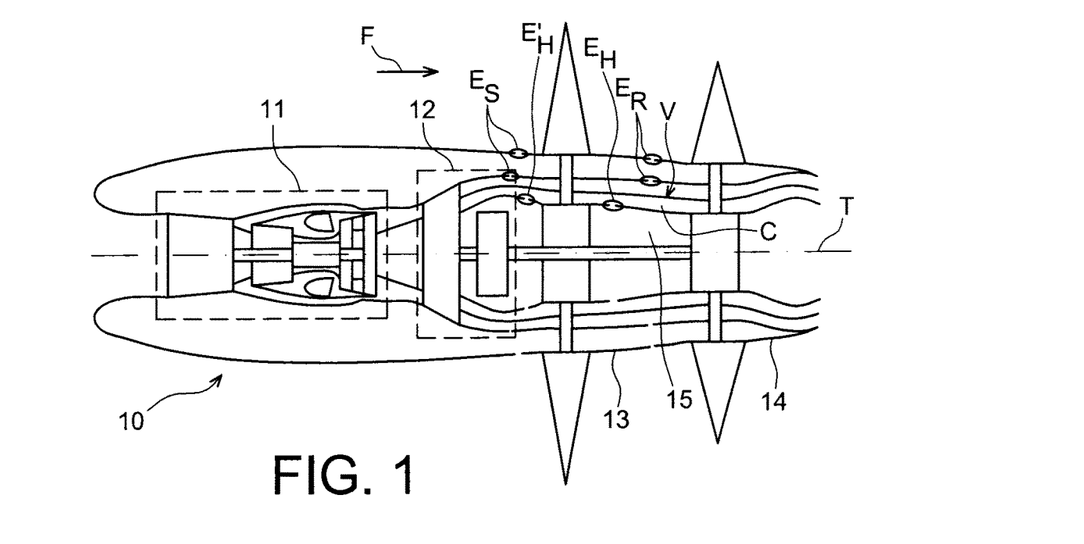
FIG. 1 shows, in axial cross-section, an example turbomachine having an "open rotor" architecture.

As an example, FIG. 1 diagrammatically shows, in axial cross-section, a turbomachine 10 of the "open rotor" type, provided with a pair of contrarotating open rotors. The turbomachine 10 comprises, from upstream to downstream, a gas generator 11, a power turbine and a reducer 12, first and second rotors driving the contrarotating open rotors and respectively comprising rotating nacelles 13 and 14 that must be ventilated and pressurized.

The particular architecture of this turbomachine 10 results in obtaining several tight zones, referenced $E_S$, $E_R$, $E_H$ et $E_H'$, situated at significant differences from the axis T of the turbomachine 10. Among these, they are first contrarotating tight zones $E_R$ and $E_H$, which are formed between two contrarotating bodies respectively belonging to the first and second rotors that drive the contrarotating propellers. Furthermore, there are also tight zones $E_S$ and $E_H'$ that are not contrarotating, since they are formed between the stator and the first rotor comprising the rotating nacelle 13. For these tight zones $E_S$ and $E_H'$, only the first rotor rotates relative to the stator around the axis T of the turbomachine 10. Furthermore, among these seals, there are tight zones $E_H$ and $E_H'$ that are located at the border of lubricant oil enclosures, conversely with respect to the tight zones $E_S$ and $E_R$. The tight zone $E_H'$ is formed between the stator and the first rotor, while the tight zone $E_H$, located at the border of the lubricant oil enclosures 15, is formed between the first and second rotors. For the rest of the description, we will more particularly examine the case of the tight zone $E_H$.

In order to allow the lubrication and cooling of the guide bearings of the rotating bodies, the turbomachine 10 traditionally comprises a lubrication circuit. The lubrication circuit is contained in the lubrication enclosure 15 that is arranged inside an air duct C, forming an air duct between the lubrication enclosure 15 and the aerodynamic air flow tunnel V. However, due to the proximity between the lubrication enclosure 15 and the tight zone $E_H$, it is possible that under certain conditions, a flow of oil H may escape from the lubrication enclosure 15 and penetrate the air duct C in an unwanted manner. Furthermore, such a flow of oil H may cause buildups leading to the appearance of oil imbalances in the turbomachine 10 that are detrimental for the considered radii and speeds at such a tight zone $E_H$. In fact, such imbalances may cause an unstable path with significant vibrations on the parts situated downstream from the turbomachine 10, which may cause a risk of damage.

Figure 2:
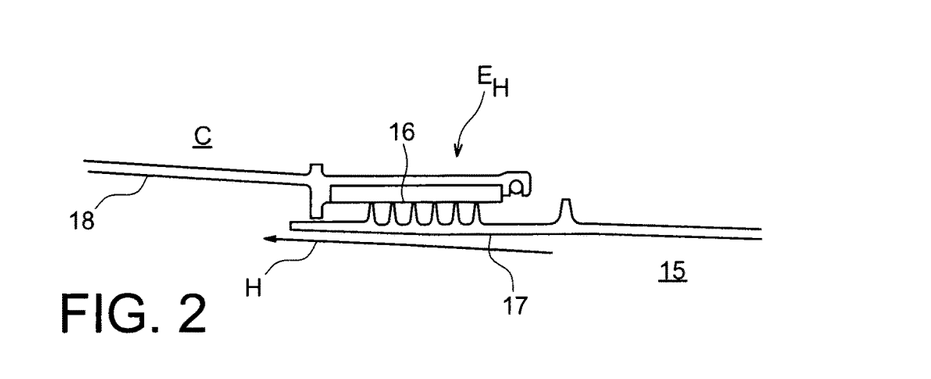
FIG. 2 shows, in a diagrammatic view that is enlarged relative to FIG. 1, a tight zone of the turbomachine, situated near the lubricating enclosure of the turbomachine, FIG. 3 diagrammatically illustrates the oil leak phenomenon appearing at the tight zone of FIG. 2 during the rotation of contrarotating rotors of the turbomachine, FIG. 4 diagrammatically illustrates a first example embodiment of a turbomachine assembly according to the invention.
Figure 3:
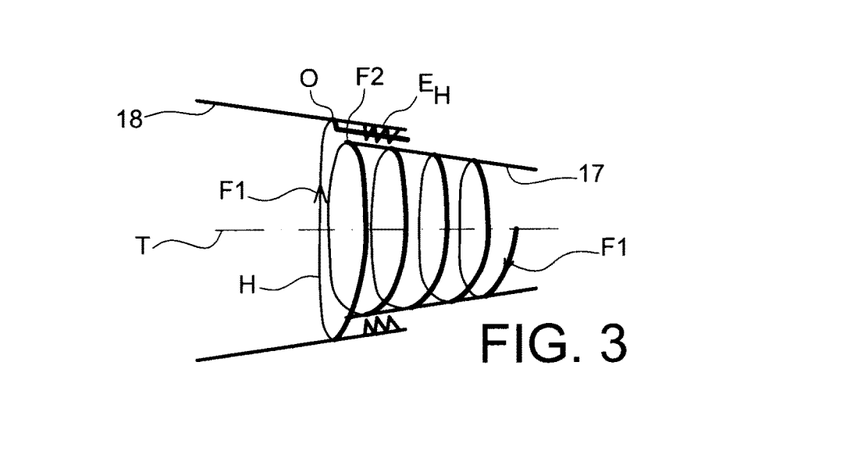

FIG. 2 more particularly shows, according to an enlarged diagrammatic view relative to FIG. 1, the tight zone $E_H$ of the turbomachine 10, provided with a labyrinth sealing gasket 16, which is situated at the interface between the lubrication enclosure 15 and the air duct C. Furthermore, FIG. 3 diagrammatically illustrates the oil leak H phenomenon appearing at the tight zone $E_H$ during the rotation. More specifically, when the oil H arrives on the second rotating wall 17, inside the lubrication enclosure 15, of the second rotor comprising the rotating nacelle 14, the oil H itself begins to rotate along arrow F1 (direction of rotation of the second rotor), as shown in FIG. 3, at a speed lower than or equal to the speed of the second rotor and then streams toward the maximum radius owing to the centrifugal force. In this way, the oil H is driven by the second wall 17 and arrives on the first wall 18, inside the lubrication enclosure 15, of the first rotor comprising the rotating nacelle 13 with a direction of rotation opposite that of the first wall 18, such that the first and second rotors have opposite directions of rotation. Then, before being driven in the direction of rotation of the first wall 18, the oil H first obtains a zero speed of rotation (reference O in FIG. 3), as a result of which it is only subjected to gravitational force. Thus, the oil H falls and streams along arrow F2 toward the sealing gasket 16 of the tight zone $E_H$. The sealing gasket 16 is then submerged in the oil H. Furthermore, a speed of rotation of the oil H lower than the speed of rotation of the rotor may cause unwanted imbalances to appear.

BRIEF DESCRIPTION OF THE INVENTION

There is thus a need to improve the circulation of a flowing fluid, in particular lubricant oil, in a turbomachine, and in particular a turbomachine of the open rotor type. In particular, there is a need to prevent lubricant oil from rising from a lubrication enclosure toward a tight zone comprising the sealing gasket, in particular a need to avoid obtaining a zero speed of rotation of the oil driven to pass between two walls of two bodies of the turbomachine, in particular two contrarotating rotors.

The invention aims to at least partially resolve the needs described above and the drawbacks relative to the embodiments of the prior art.

According to one aspect, the invention thus relates to a turbomachine assembly, comprising first and second bodies, at least one of which is rotatable relative to the other around the axis of rotation of the turbomachine, between which a linking zone is formed between the first and second bodies, a flowing fluid, in particular lubricant oil, being able to circulate in contact with the least said at least one rotating body, characterized in that said at least one rotating body comprises means for rotational guiding, in the direction of rotation of said at least one rotating body, of the flowing fluid in contact with said at least one rotating body so as to drive the flow of fluid closer to or further from the linking zone.

Preferably, the first and second bodies are contrarotating around the axis of rotation of the turbomachine.

The linking zone may for example be a tight zone comprising a sealing gasket.

The flowing fluid may in particular be able to circulate inside or outside at least said at least one rotating body. In particular, it may be able to circulate in contact with a wall of at least said at least one rotating body, in particular the inner wall or the outer wall of at least said at least one rotating body.

Likewise, the means for guiding the rotation of the flowing fluid can be formed by a wall of said at least one rotating body, in particular the inner wall or the outer wall.

Furthermore, at least said at least one rotating body can comprise a conical wall, in particular the inner wall. The means for guiding the rotation of the flowing fluid can be formed on said conical wall. The other body can also comprise a conical wall, in particular the inner wall, and the guide means can also be formed on that conical wall. "Conical wall" must be understood as meaning that the wall substantially forms a cone around the axis of rotation of the turbomachine, in particular a truncated cone. In other words, the wall extends moving away from or closer to the axis of rotation of the turbomachine when observed from upstream to downstream or from downstream to upstream. The conical shape of the wall can make it possible to have centrifugal driving of the flowing fluid in contact therewith.

The guiding means may be of different types.

Preferably, the rotational guiding means comprise a helical fin in the direction of rotation of said at least one rotating body, in particular positioned on the inner or outer wall of said at least one rotating body.

Thus, the invention also relates, according to another of its aspects, to a turbomachine assembly comprising first and second bodies, at least one of which is rotatable relative to the other around the axis of rotation of the turbomachine, between which a linking zone is formed between the first and second bodies, a flowing fluid, in particular lubricant oil, being able to circulate in contact with at least said at least one rotatable body, characterized in that said at least one rotating body comprises a helical fin, in the direction of rotation of said at least one rotating body, to guide the rotation of the flowing fluid in contact with said at least one rotating body so as to drive the flowing fluid closer to or further from the linking zone.

Also preferably, the rotational guiding means comprise a plurality of longitudinal fins extending substantially along the axis of rotation of the turbomachine, in particular arranged on the inner or outer wall of said at least one rotating body.

Thus, the invention also relates, according to another of its aspects, to a turbomachine assembly comprising first and second bodies, at least one of which is rotatable relative to the other around the axis of rotation of the turbomachine, between which a linking zone is formed between the first and second bodies, a flowing fluid, in particular lubricant oil, being able to circulate in contact with at least said at least one rotatable body, characterized in that said at least one rotating body comprises plurality of helical fins, extending substantially along the axis of rotation of the turbomachine, to guide the rotation of the flowing fluid in contact with said at least one rotating body so as to drive the flowing fluid closer to or further from the linking zone.

Still more specifically, the invention relates, according to another of its aspects, to a turbomachine assembly comprising first and second bodies, at least one of which is rotating relative to the other around the axis of rotation of the turbomachine, between which a tight zone is formed comprising a sealing gasket, a flowing fluid, in particular lubricant oil, able to circulate inside the first and second bodies and to be driven toward said at least one rotating body from the other body, characterized in that said at least one rotating body comprises means for guiding the rotation, in the direction of rotation of said at least one rotating body, of the flow of fluid inside said at least one rotating body so as to drive the flowing fluid away from the tight zone.

The passage of the flowing fluid from the other body toward said at least one rotating body is done at a zone called "ejection zone" of the flowing fluid. Advantageously, the guiding means are formed on said at least one rotating body from said ejection zone of the flowing fluid from the other body toward said at least one rotating body and extend inside said at least one rotating body moving away from that flowing fluid ejection zone.

Furthermore, advantageously, the first and second bodies are contrarotating around the axis of rotation of the turbomachine. Furthermore, the flowing fluid can thus be capable of circulating inside the first and second contrarotating bodies and of being driven by the second rotating body toward the first rotating body in the direction of rotation of the second rotating body. The first rotating body can then comprise means for guiding the rotation, in the rotation direction of the first rotating body, of the flowing fluid inside the first rotating body so as to drive the flowing fluid away from the tight zone.

Owing to the invention, it may thus be possible to make the circulation of a flowing fluid, and in particular a lubricant oil, more effective in a turbomachine, and in particular for a turbomachine of the "open rotor" type. More specifically, it may for example be possible to drive the lubricant oil passing between two contrarotating bodies defining a tight zone provided with a sealing gasket, from one body toward the other body, without generating recirculation of the lubricant oil toward the sealing gasket, which would result in submerging it. Furthermore, such driving of the lubricant oil away from the tight zone can also make it possible to significantly decrease the risk of oil imbalance.

The turbomachine assembly according to the invention may further comprise one or more of the following characteristics, considered alone or according to any technically possible combination(s).

The first and second bodies may in particular be formed by casings of the turbomachine.

The first body may comprise a first inner wall, in contact with which the flowing fluid can be driven. Likewise, the second body may comprise a second inner wall, in contact with which the flowing fluid can be driven.

The tight zone between the first and second bodies can be situated at a sealing radius height, i.e., the tight zone can be situated at a significant distance from the axis of the turbomachine, for example comprised between 300 and 800 mm relative to the axis of the turbomachine.

The sealing gasket may be a labyrinth sealing gasket. Furthermore, the first wall of the first body may comprise a wearing part made from an abradable material and the second wall of the second body may comprise tongues across from said wearing part.

The guide means may be formed on a wall of said at least one rotating body, in particular the inner wall, at least partially not superimposed on the other body.

Furthermore, the guiding means may advantageously extend axially over a wall of said at least one rotating body, in particular the inner wall, in at least the majority of said at least one rotating body.

The guide means may comprise elements, which may or may not be attached, making up raised portions on the first inner wall of the first body.

The guide means of the first body may in particular comprise at least one guide fin extending, at least partially, over the first inner wall of the first body. The guide fin(s) may be configured to allow a change in the direction of rotation of the flowing fluid, from the second body toward the first body, in particular to allow the flowing fluid to flow in the direction of rotation of the first body. In particular, the guide fin(s) may comprise a profile oriented in the direction of rotation of the first body such that the flowing fluid, coming into contact with that profile, is forced to circulate in the first body in the direction of rotation of the first body.

More specifically, according to one embodiment of the invention, the means for driving the rotation of the first body may comprise a helical fin in the direction of rotation of the first body, arranged on the first inner wall of the first body.

The helical fin is preferably continuous. Alternatively, the helical fin may be discontinuous, then comprising a plurality of helical sub-fins.

The helical fin may be formed, on the first inner wall of the first body, substantially from the ejection zone of the flowing fluid from the second body toward the first body and extend inside the first body moving away from that first ejection zone. In particular, the helical fin may be formed substantially from the part of the first inner wall of the first body bordering the tight zone, in particular substantially from the part of the first inner wall of the first body situated upstream from the first tight zone and not superimposed on the second body.

The helical fin may be similar to the thread of a screw. The helical fin may or may not have a regular pitch.

In a first alternative, the helical fin may have, in section along the axis of rotation of the turbomachine, a substantially perpendicular profile with respect to the axis of rotation of the turbomachine.

In a second alternative, the helical fin may have, in section along the axis of rotation of the turbomachine, a substantially inclined profile relative to the first inner wall of the first body.

The helical fin may in particular have, in section along the axis of rotation of the turbomachine, a substantially inclined profile relative to the first inner wall of the first body coming closer to the tight zone or moving away from the tight zone.

Preferably, the helical fin has a substantially inclined profile coming closer to the tight zone. In fact, such an orientation of the helical fin may advantageously make it possible to prevent, or at least optionally limit, a flow of the fluid toward the sealing gasket because the flowing fluid, ejected from the second body, may stream directly over the inclined helical fin toward the second body and be driven directly by the rotation of the first body moving away from the sealing gasket.

According to a second embodiment of the invention, the means for driving the rotation of the first body can comprise a plurality of longitudinal fins extending substantially along the axis of rotation of the turbomachine over the first inner wall of the first body.

Thus, advantageously, the flow of fluid ejected from the second body can fall onto the first inner wall of the first body between two successive longitudinal fins and be carried away from the sealing gasket at the speed of rotation of the first body.

The longitudinal fins may or may not be distributed regularly on the first inner wall of the first body. In other words, the spacing (or the pitch) between the longitudinal fins may or may not be constant. Furthermore, the longitudinal fins may or may not be identical to each other, in particular having a similar or dissimilar shape and/or dimensions.

The longitudinal fins may further have, in section along the axis of rotation of the turbomachine, a profile with an increasing or decreasing thickness moving closer to the tight zone.

In a first alternative, the inner face of each longitudinal fin, opposite the outer face situated on the first wall of the first body, may have, in cross-section relative to the axis of rotation of the turbomachine, a profile substantially parallel to the first wall of the first body.

In other words, the inner face of each longitudinal fin may extend, along the axis of rotation of the turbomachine, substantially parallel to the part of the first wall of the first body on which the outer face is situated. Each longitudinal fin may in particular have a substantially rectangular profile in cross-section relative to the axis of the turbomachine.

In a second alternative, the inner face of each longitudinal fin, opposite the outer face situated on the first inner wall of the first body, may have, in cross-section relative to the axis of rotation of the turbomachine, a profile substantially inclined relative to the first wall of the first body.

In other words, the inner face of each longitudinal fin may extend closer to the first wall of the first body, transversely relative to the axis of rotation of the turbomachine. Each longitudinal fin may in particular have, in cross-section relative to the axis of rotation of the turbomachine, a rectangular profile truncated at the inner face.

The incline of the inner face of each longitudinal fin relative to the first wall of the first body, when observed in the direction of rotation of the first body, can be produced by bringing the first wall of the first body closer.

Such an incline of the inner face of each longitudinal fin can make it possible to help the flowing fluid stream toward an area situated between two longitudinal fins. In fact, in the case where a flowing fluid falls, from the second body toward the first body, directly on a longitudinal fin, the incline thereof can allow fluid to be conveyed between two longitudinal fins so as to be driven at the speed of rotation of the first body moving away from the sealing gasket.

Furthermore, the second body may comprise fins to force the flow of the fluid in the direction of rotation of the second body, the fins in particular extending, when observed in the direction of rotation of the second body and in cross-section along the axis of rotation of the turbomachine, coming closer to the axis of rotation of the turbomachine.

Such fins for forcing the flow of the flowing fluid in the direction of rotation of the second body can advantageously be used as a supplement to the guiding means present on the first body. In fact, the forcing fins can make it possible to reduce the speed of rotation of the flowing fluid driven by the second body, and can thus allow the flowing fluid to be carried more easily by the guiding means in the direction of rotation of the first body. In particular, the incline of the forcing fins relative to the axis of rotation of the turbomachine can be determined so as to drive the flowing fluid in the direction of rotation of the first body. The forcing fins of the second body and the guide means of the first body, in particular a helical fin or longitudinal fins, can thus have the opposite incline relative to the axis of rotation of the turbomachine and respectively associated with the directions of rotation of the second body and the first body.

Furthermore, according to another aspect, the invention also relates to a turbomachine, characterized in that it comprises an assembly as previously described.

The turbomachine may in particular be of the open rotor type, comprising a pair of contrarotating open rotors, in particular situated downstream from a combustion chamber of the turbomachine, supported by first and second rotors, the first and second bodies of the assembly respectively being casings of the first and second rotors.

The first and second bodies may be casings of the first and second rotors of the turbomachine, situated on the turbomachine such that a lubricant oil enclosure is found inside them, and a circulation duct for a flow of air is located outside them.

The tight zone of the turbomachine assembly may be situated at a high sealing radius of the turbomachine, i.e., situated a significant distance from the axis of the turbomachine, in particular situated at a sealing radius comprised between 300 and 800 mm relative to the axis of the turbomachine.

The invention also relates, according to other aspects, to a method for guiding a stream of flowing fluid, in particular lubricant oil, from a second body, which in particular is a rotating body, toward a first rotating body of a turbomachine assembly, the first and second bodies in particular being contrarotating around the axis of rotation of the turbomachine, a tight zone comprising a sealing gasket being formed between the first and second bodies, in which rotational guiding means are provided, in the direction of rotation of the first rotating body, for guiding the flowing fluid inside the first rotating body so as to drive the flowing fluid away from the tight zone.

As previously indicated, the passage of the flowing fluid from the second body toward the first rotating body is done at a zone called "ejection zone" of the flowing fluid. Furthermore, advantageously, the guiding means are formed on the first rotating body from that ejection zone of the flowing fluid from the second body toward the first rotating body and extend inside the first rotating body moving away from that ejection zone of the flowing fluid.

The guiding method according to the invention may comprise any one of the previously described characteristics, considered alone or according to all technically possible combinations with other characteristics.

BRIEF DESCRIPTION OF THE DRAWINGS

The invention will be better understood upon reading the following detailed description of examples of non-limiting embodiments thereof, as well as upon examining the diagrammatic and partial figures of the appended drawings, in which.

In all of these figures, identical references may designate identical or similar elements.

Furthermore, the different parts shown in the figures are not necessarily shown using a uniform scale, so as to make the figures more legible.

DETAILED DESCRIPTION OF THE INVENTION

In the entire description, it is noted that the terms upstream and downstream must be considered relative to a main normal flow direction F of the gases (from upstream to downstream) for a turbomachine 10. Furthermore, the axis T of the turbomachine 10 refers to the radial axis of symmetry of the turbomachine 10. The axial direction of the turbomachine 10 corresponds to the direction of the axis T of the turbomachine 10. A radial direction of the turbomachine 10 is a direction perpendicular to the axis T of the turbomachine 10. Furthermore, unless otherwise specified, the adjectives and adverbs axial, radial, axially and radially are used in reference to the aforementioned axial and radial directions. Furthermore, unless otherwise specified, the terms inner and outer are used in reference to a radial direction such that the inner part of an element is closer to the axis T of the turbomachine 10 than the outer part of the same element.

FIGS. 1 to 3 have already been described in the part relative to the prior state of the art.

Example embodiments of a turbomachine assembly 1 according to the invention have also been illustrated in reference to FIGS. 4 to 10.

In all of these example embodiments according to the invention, it is considered that the first 2 and second 3 bodies of the turbomachine assembly 1 are contrarotating around the axis of rotation T of the turbomachine 10. In other words, in reference to FIG. 1 previously described, the first 2 and second 3 contrarotating bodies respectively correspond to casings of the first and second rotors driving the contrarotating open rotors of the turbomachine 10 and respectively comprising the rotating nacelles 13 and 14, between which the tight zones $E_R$ and $E_H$ are formed.

Furthermore, in all of these example embodiments, it is also considered that the first 2 and second 3 bodies are those between which the tight zone $E_H$ is formed in reference to FIG. 1, i.e., that located at the border of the lubricant oil enclosure 15.

Of course, these example embodiments are in no way limiting. In particular, the invention may be situated in any one of the tight zones $E_S$, $E_R$ and $E_H'$ previously described. Thus for example, only one (that toward which the fluid is designed to flow) of the first 2 and second 3 bodies could be rotatable relative to the other and a tight zone $E_S$ or $E_H'$ (the zone $E_H'$ being located near a lubricant oil enclosure) could be formed between those first 2 and second 3 bodies. Also alternatively, the first 2 and second 3 bodies could be contrarotating, but a tight zone $E_R$ would be formed between them, in particular not situated near a lubricant oil enclosure.

Lastly, in all of the examples described below, it will be considered that the flowing fluid is lubricant oil H.

We will thus now more precisely describe the examples of FIGS. 4 to 10, for which the invention is located at the tight zone $E_H$ shown in FIG. 1.

The assembly 1 comprises first 2 and second 3 contrarotating bodies around the axis of rotation T of the turbomachine 10, the latter being able to be of the type previously described in reference to FIG. 1, i.e., an "open rotor" turbomachine 10.

Furthermore, a tight zone $E_H$ is formed between the first 2 and second 3 contrarotating bodies, that tight zone $E_H$ comprising a sealing gasket 16, for example of the labyrinth seal type.

The tight zone $E_H$ is for example situated between a lubricant oil enclosure 15 and the conduit C. The air conduit C forms an air conduit between the lubricant enclosure 15 and the aerodynamics tunnel V for circulation of a flow of air of the turbomachine 10. As a result, as previously stated in the part relative to the prior state of the art, lubricant oil H circulating inside the second rotating body 3 can stream toward the sealing gasket 16 and thus submerge it, and go toward the conduit C.

Thus, according to the invention, the first rotating body 2 comprises means for guiding the rotation, in the form of guide fins 4a, 4b, 4c, 5a or 5b, in the direction of rotation F3 of the first rotating body 2, of the lubricant oil H inside the first rotating body 2 so as to drive the lubricant oil H away from the tight zone $E_H$.

Consequently, owing to the invention, the presence of the guide means 4a, 4b, 4c, 5a or 5b, upstream from the sealing gasket 16, makes it possible to prevent, or at least reduce, the circulation of the lubricant oil H toward the sealing gasket 16 due to the driving that they create in the direction opposite the direction of rotation F1 of the second rotating body 3. The submersion of the sealing gasket 16 can thus be avoided.

Figure 4:
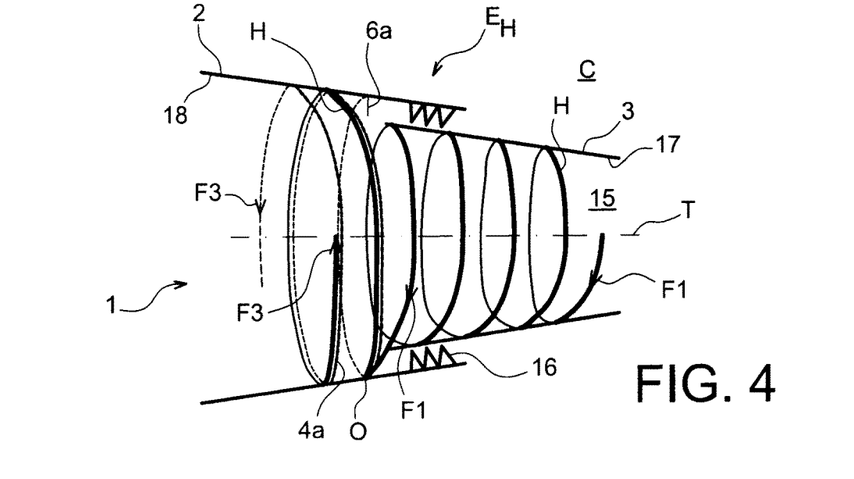
Figure 5:
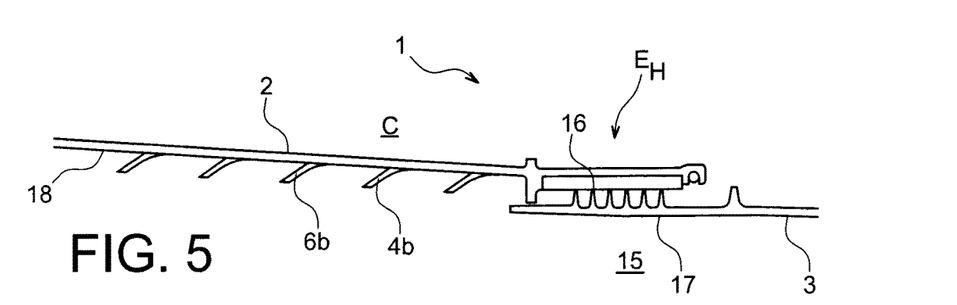
FIG. 5 illustrates, in partial cross-section along the axis of rotation of the turbomachine, a second example embodiment of a set of turbomachines according to the invention.
Figure 6:
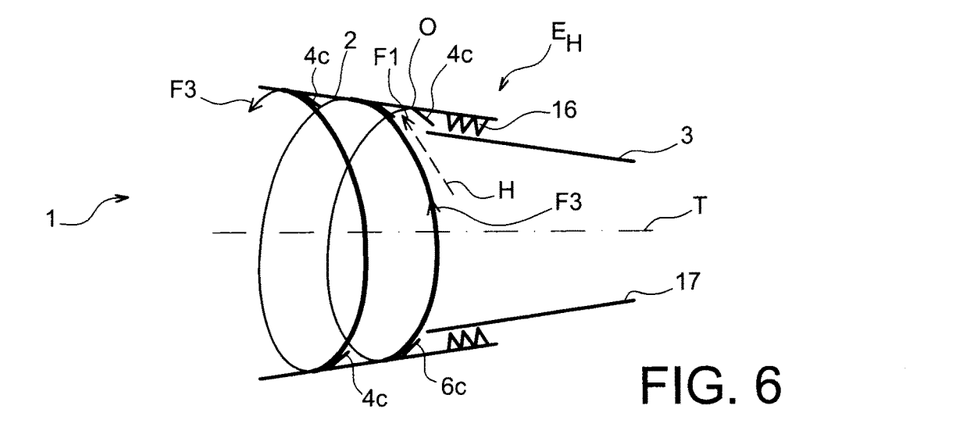
FIG. 6 is a partial and diagrammatic illustration of a third example embodiment of a turbomachine assembly according to the invention, FIG. 7 diagrammatically shows a fourth example embodiment of a turbomachine assembly example according to the invention.

FIGS. 4, 5 and 6 first illustrate three alternatives of a first embodiment of the means for guiding the first rotating body 2. In that first embodiment, the guiding means comprise a helical fin 4a, 4b or 4c in the direction of rotation F3 of the first rotating body 2, positioned on the first inner wall 18 of the first rotating body 2.

Preferably, the helical fin 4a, 4b or 4c could be formed, on the first inner wall 18 of the rotating body 2, substantially from the ejection zone of the lubricant oil H from the second rotating body 3 toward the first rotating body 2 and extend inside the first rotating body 2 moving away from that ejection zone.

Said lubricant oil H ejection zone corresponds to the passage of the lubricant oil H from the second rotating body 3 toward the first rotating body 2. In particular, the axial span of the second rotating body 3 is interrupted at that ejection zone, while the axial span of the first rotating body 2 begins at that ejection zone, such that when the lubricant oil H coming from the second rotating body 3 arrives at the ejection zone, it flows directly toward the first rotating body 2 which, at that ejection zone, then immediately drives it via the helical fin 4a, 4b or 4c.

The helical fin 4a, 4b or 4c can further be comparable to the thread of a screw, which may or may not have a regular pitch.

According to the first alternative of FIG. 4, the helical fin 4a has, in cross-section along the axis of rotation T of the turbomachine 10, a substantially perpendicular profile 6a relative to the axis of rotation T of the turbomachine 10.

According to the second alternative of FIG. 5, which partially illustrates the embodiment of the helical fin 4b (only at the first inner wall 18 of the first rotating body 2), the helical fin 4b has, along the axis of rotation T of the turbomachine 10, a substantially inclined profile relative to the first inner wall 18 of the first rotating body 2, moving away from the tight zone $E_H$.

According to the third alternative of FIG. 6, which also partially illustrates the production of the helical fin 4c (only at the first inner wall 18 of the first rotating body 2), the helical fin 4c has, in cross-section along the axis of rotation T of the turbomachine 10, a substantially inclined profile 6c relative to the first inner wall 18 of the first rotating body 2, coming closer to the tight zone $E_H$.

It should be noted that in FIGS. 5 and 6, although the helical fin 4b or 4c has been shown partially (i.e., discontinuously) for simplification purposes, the helical fin 4b or 4c is preferably continuous, similarly to the helical fin 4a illustrated in FIG. 4.

Advantageously, the helical fin can be provided to be like the helical fin 4c shown in FIG. 6, i.e., with an inclined profile 6c coming closer to the tight zone $E_H$. Such an orientation of the helical fin 4c can make it possible to reduce, or even prevent, streaming of the lubricant oil H toward the sealing gasket 16. The incline of the helical fin 4c can in fact allow the lubricant oil H, at the outlet of the second rotating body 3, to stream directly on the inclined profile 6c of the helical fin 4c and be directly driven inside the first rotating body 2 in the direction of rotation F3 thereof.

The presence of the helical fin 4a, 4b or 4c in the first rotating body 2 can make it possible to obtain the following result: the lubricant oil H that circulates inside the second rotating body 3, in contact with the second inner wall 17 of the second rotating body 3, at the speed of rotation and in the direction of rotation F1 of the second rotating body 3, will be driven by the screw pitch formed by the helical fin 4a, 4b or 4c when it is ejected from the second rotating body 3 and arrives at a point of contact O (see FIGS. 4 and 6) of the first inner wall 18 of the first rotating body 2, with a change in the direction of rotation along the direction of rotation F3 of the first rotating body 2.

In other words, in comparison with the situation according to the prior art in which the lubricant oil H obtained a zero speed of rotation in contact with the first inner wall 18 of the first rotating body 2, which then drove it by gravitational force toward the sealing gasket 16, the guide means of the first rotational body 2 according to the invention make it possible to obtain a change quickly in the direction of rotation of the lubricant oil H, from the direction of rotation F1 toward the direction of rotation F3, and allow driving of the lubricant oil H inside the first rotating body 2 away from the tight zone $E_H$, as well as the decreased risk of imbalance.

The means for guiding the first rotating body 2 thus act as a circulation accelerator for the lubricant flow H in a direction of rotation opposite that with which they come into contact with said guide means.

FIGS. 7, 8, 9 and 10 also show two alternatives of a second embodiment of the guide means for the first rotating body 2. In this second alternative, the means for guiding the rotation of the first rotating body 2 comprise a plurality of longitudinal fins 5a, 5b extending substantially along the axis of rotation T of the turbomachine 10 on the first inner wall 18 of the first rotating body 2.

Such an embodiment advantageously allows the lubricant oil H ejected from the second rotating body 3 to fall under the first inner wall 18 of the first rotating body 2 in the space e between two successive longitudinal fins 5a or 5b so as to be carried away from the sealing gasket 16 at the speed of rotation of the first rotating body 2.

Figure 7:
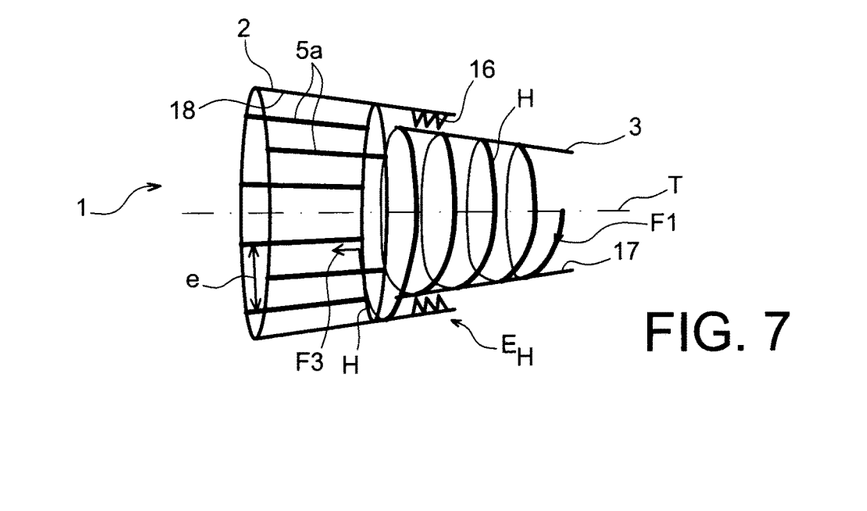
Figure 8:
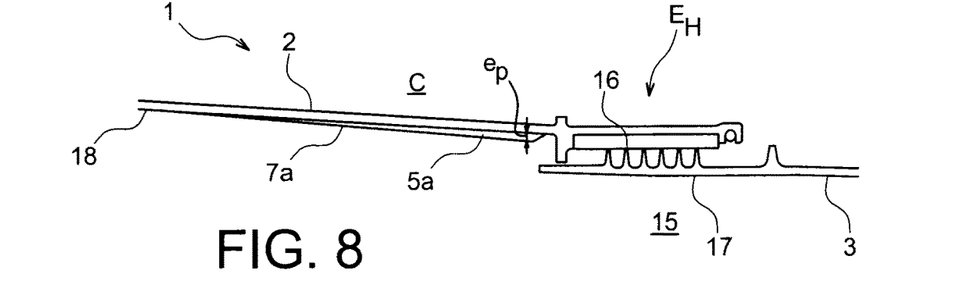
FIG. 8 shows, in partial cross-section along the axis of rotation of the turbomachine, the turbomachine assembly of FIG. 7.
Figure 9:
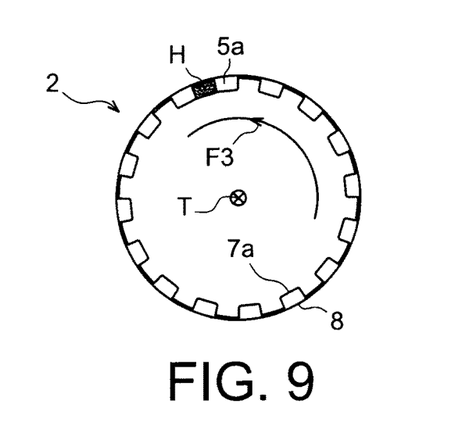
FIG. 9 illustrates, in partial cross-section relative to the axis of rotation of the turbomachine, the first rotating body of the turbomachine assembly of FIG. 7.

FIGS. 7, 8 and 9 show a first alternative embodiment of the longitudinal fins 5a, according to which the inner face 7a of each longitudinal fin 5a, opposite the outer face 8 situated on the first wall 18 of the first rotating body 2, has, in cross-section relative to the axis of rotation T of the turbomachine 10, a profile substantially parallel to the first wall 18 of the first rotating body 2, as can particularly be seen in FIG. 9. In other words, the inner face 7a of each longitudinal fin 5a extends along the axis of rotation T of the turbomachine 10, substantially parallel to the part of the first wall 18 of the first rotating body 2 on which the outer face 8 is situated.

Furthermore, as shown in FIG. 8, these longitudinal fins 5a can have, in the cross-section along the axis of rotation T of the turbomachine 10, a profile with increasing thickness $e_p$ coming closer to the tight zone $E_H$. Alternatively, this thickness $e_p$ could also decrease as it approaches the tight zone $E_H$.

Thus, advantageously, the production of longitudinal fins 5a on the first inner wall 18 of the first rotating body 2 can allow a change in direction of rotation of the lubricant oil H, which goes from the direction of rotation F1 of the second rotating body 3 to the direction of rotation F3 of the first rotating body 2, and driving of the lubricant oil H moving away from the tight zone $E_H$ to the inside of the first rotating body 2, when the lubricant oil H arrives in the space e between two successive longitudinal fins 5a.

However, the lubricant oil H, once ejected from the second rotating body 3 toward the first rotating body 2, falls on a longitudinal fin 5a and not into the area e provided between two successive longitudinal fins 5a.

Figure 10:
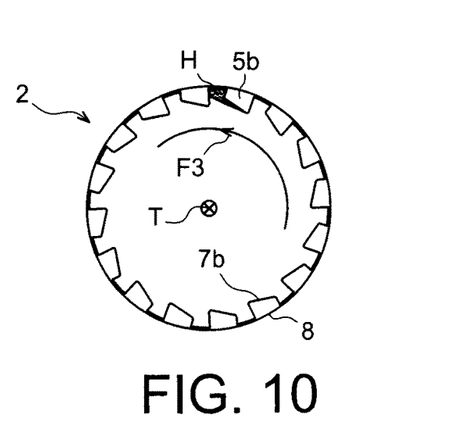
FIG. 10 illustrates, in partial cross-section relative to the axis of rotation of the turbomachine, a fifth example embodiment of the first rotating body of a turbomachine assembly according to the invention.

FIG. 10 thus illustrates a second alternative embodiment of the longitudinal fins 5b, in which the inner face 7b of each longitudinal fin 5b, opposite the outer face 8 situated on the first inner wall 18 of the first rotating body 2, has, in cross-section relative to the axis of rotation T of the turbomachine 10, an inclined profile relative to the first wall 18 of the first rotating body 2.

In particular, the incline of the inner face 7b of each longitudinal fin 5b relative to the first wall 18 of the first rotating body 2, when observed in the direction of rotation F3 of the first rotating body 2, is made by bringing the first wall 18 closer to the first rotating body 2.

Advantageously, this embodiment makes it possible to help the lubricant oil H flow toward an area e situated between two successive longitudinal fins 5b, for the case where the lubricant oil H comes directly into contact with a longitudinal fin 5b, as can be seen in FIG. 10.

Furthermore, it should be noted that for all of the example embodiments of FIGS. 7 to 10, as previously indicated for the helical fin 4a, 4b or 4c of the examples of FIGS. 4, 5 and 6, the passage of the lubricant oil H from the second rotating body 3 toward the first rotating body 2 is done at an ejection zone of the lubricant oil H, and the longitudinal fins 5a, 5b can be formed on the first rotating body 2 from that ejection zone and extend inside the first rotating body 2 while moving away from that ejection zone.

Figure 11:
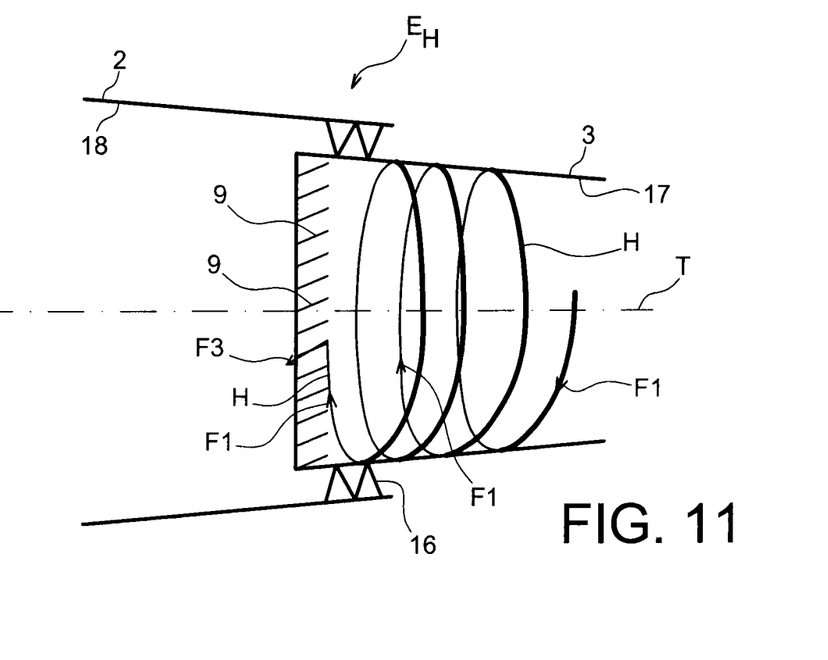
FIG. 11 is a partial diagrammatic illustration of an alternative embodiment of the second rotating body for a turbomachine assembly according to the invention.

FIG. 11 illustrates an alternative embodiment of the second rotating body 3 of a turbomachine 10 assembly 1 according to the invention, seeking to further improve the results obtained with the guide means present on the first rotating body 2 of the assembly 1.

According to this embodiment, the second rotating body 3 comprises fins 9 for forcing the flow of lubricant oil H in the direction of rotation F1 of the second rotating body 3, so as to thereby facilitate the change of the flow direction of the lubricant oil H toward the direction of rotation F3 of the first rotating body 2. In particular, the forcing fins 9 extend, when observed along the direction of rotation F1 of the second rotating body 3 and in cross-section along the axis of rotation T of the turbomachine 10, coming closer to the axis of rotation T of the turbomachine 10.

This orientation of the forcing fins 9, in the direction opposite the direction of rotation F3 of the first rotating body 2, and in particular in the direction opposite the orientation given to a helical fin 4c or a longitudinal fin 5b, makes it possible to reduce the speed of rotation of the lubricant oil H circulating in the second rotating body 3 when it reaches its ejection zone toward the first rotating body 2. In this way, the second rotating body 3 already makes it possible to force the circulation of the circulating oil H in the direction of rotation F3 of the first rotating body 2, even before the lubricant oil H penetrates inside the first rotating body 2 in contact with the first inner wall 18 of the first rotating body 2.

Furthermore, in order to obtain the best possible guiding of the lubricant oil H from the second rotating body 3 toward the first rotating body 2 so as to allow the lubricant oil H to move away from the sealing zone $E_H$, it may be possible to determine the inclines or lengths given to the helical fins 4a, 4b or 4c or longitudinal fins 5a or 5b differently, as well as the pitch of the helical fins 4a, 4b or 4c or the spacing e between the longitudinal fins 5a or 5b.

Furthermore, the longitudinal and radial profiles of the fins may be determined in order to prevent the lubricant oil H from flowing while leaving the second rotating body 3, directly in contact with a wall that may make its speed of rotation zero and be at the origin of potential streaming toward the sealing gasket 16 and an imbalance.

Figure 12:
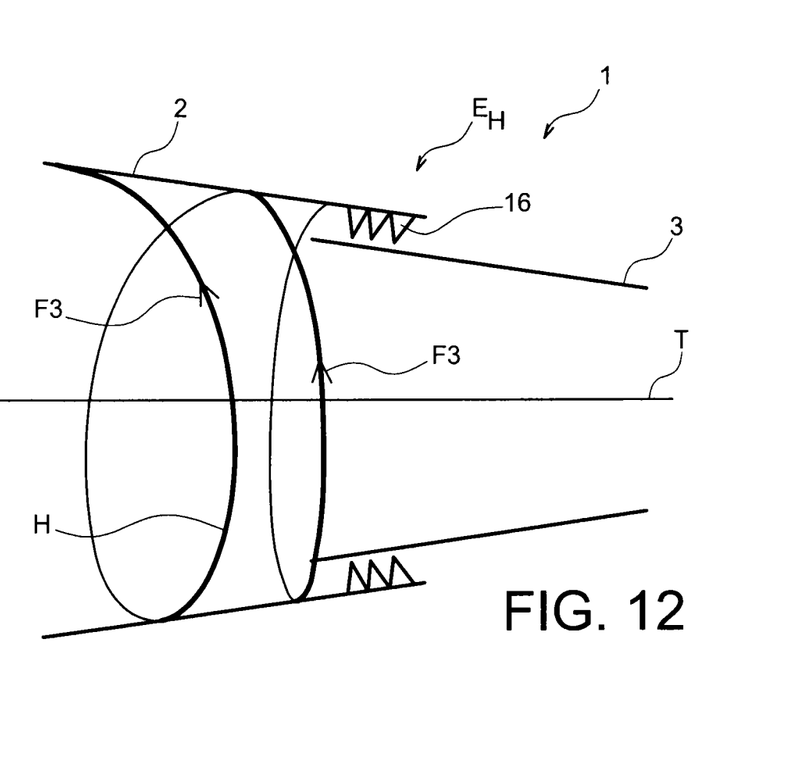
FIG. 12 illustrates an alternative flow of the lubricant oil in the first rotating body of a turbomachine assembly according to the invention by varying characteristics of the guide means of the first rotating body.

To that end, FIG. 12 illustrates an alternative flow example that may be obtained for the lubricant oil H inside the first rotating body 2 in the direction of rotation F3 of the first rotating body 2. In that FIG. 12, for clarity reasons, the guide fins have not been shown, and only the flow of the lubricant oil H inside the first rotating body 2 appears.

The flow variation of the lubricant oil H may in particular be obtained by a pitch or separation variation of the helical or longitudinal fins, a frequency variation and/or a shape variation of the helical or longitudinal fins.

Furthermore, in all of the examples previously described, the guide fins 4a, 4b, 4c, 5c or 5b of the first rotating body 2 are formed on the inner wall 18 of the first rotating body 2 so as preferably not to be superimposed on the second rotating body 3, and so as to extend axially over the majority of the first rotating body 2.

Of course, the invention is not limited to the example embodiments described above. Various modifications may be made thereto by one skilled in the art.

The expression "comprising a" must be understood as being synonymous with "comprising at least one" unless otherwise specified.

The invention claimed is:

1. A turbomachine assembly, comprising:
   first and second bodies, the first body rotating relative to the second body around an axis of rotation of the turbomachine assembly, a tight zone formed between an outer surface of a first end of the second body and an inner surface of a first end of the first body, the tight zone comprising a sealing gasket, a flowing fluid, able to circulate inside the first and second bodies and to be driven toward the first body from the second body, and a passage of the flowing fluid from the second body toward the first body being done at an ejection zone of the flowing fluid,
   wherein the inner surface of the first body comprises a fin which guides, in a direction of rotation of the first body, the flowing fluid inside the first body, the fin formed on the first body from the ejection zone of the flowing fluid in the second body toward a second end of the first body and extending inside the first body while moving away from the ejection zone of the flowing fluid, so as to drive the flowing fluid away from the tight zone towards the second end of the first body, the flowing fluid rotating in a first direction in the first body and the flowing fluid rotating in a second direction, opposite the first direction, in the second body.

2. The assembly according to claim 1, wherein the first and second bodies are contrarotating around the axis of rotation of the turbomachine assembly.

3. The assembly according to claim 1, wherein the first body comprises a conical wall and wherein the fin is formed on said conical wall.

4. The assembly according to claim 1, wherein the fin is a helical fin in the direction of rotation of the first body.

5. The assembly according to claim 1, wherein the fin is a longitudinal fin extending along the axis of rotation of the turbomachine assembly.

6. A turbomachine comprising the assembly according to claim 1.

7. The turbomachine according to claim 6, wherein the turbomachine is of an open rotor turbomachine, comprising a pair of contrarotating open rotors supported by first and second rotors, the first and second bodies of the assembly respectively being casings of the first and second rotors.

8. A method for guiding a stream of flowing fluid from a second body toward a first rotating body of a turbomachine assembly, a passage of the flowing fluid from the second body toward the first rotating body being done at an ejection zone of the flowing fluid, and a tight zone comprising a sealing gasket being formed between the first and second bodies, the method comprising:
   providing a fin which guides the flowing fluid inside the first rotating body in a first direction of rotation of the first rotating body, the fin formed on an inner surface of the first rotating body from the ejection zone of the flowing fluid from the second body toward the first rotating body and extending inside the first rotating body moving away from the ejection zone for the flowing fluid;
   driving the flowing fluid away from the tight zone; and
   rotating the flowing fluid in a second direction, opposite the first direction, in the second body.

* * * * *